United States Patent [19]

Xolin et al.

[11] Patent Number: 5,560,264
[45] Date of Patent: Oct. 1, 1996

[54] METHOD FOR MANUFACTURING A MOTOR VEHICLE STEERING WHEEL, AND STEERING WHEEL OBTAINED THEREBY

[75] Inventors: Frédéric Xolin, Audincourt; Bernard Goisset, Blamont, both of France

[73] Assignee: ECIA-Equipements et Composants pour l'Industrie Automobile, Audincourt, France

[21] Appl. No.: 346,197

[22] Filed: Nov. 22, 1994

[30] Foreign Application Priority Data

Nov. 25, 1993 [FR] France .................... 93 14120

[51] Int. Cl.⁶ ........................................ B62D 1/04
[52] U.S. Cl. .................. 74/552; 29/894.1; 280/731; 264/279; 264/328.1
[58] Field of Search ................ 74/552; 280/731, 280/750; 29/894.1; 264/279, 328.1

[56] References Cited

U.S. PATENT DOCUMENTS

| | | | |
|---|---|---|---|
| 3,837,669 | 9/1974 | Nagazumi et al. | 280/731 |
| 3,907,330 | 9/1975 | Kondo et al. | 280/731 |
| 3,984,126 | 10/1976 | Goetz et al. | 280/731 |
| 4,334,699 | 6/1982 | Patzelt et al. | 280/731 |
| 4,811,472 | 3/1989 | Kobayashi | 74/552 |
| 5,070,742 | 12/1991 | Sakane et al. | 74/552 |
| 5,228,362 | 7/1993 | Chen et al. | 74/552 |
| 5,267,487 | 12/1993 | Niwa et al. | 74/552 |

FOREIGN PATENT DOCUMENTS 367319   5/1991   European Pat. Off. .

Primary Examiner—Richard M. Lorence
Assistant Examiner—Chong H. Kim
Attorney, Agent, or Firm—Sughrue, Mion, Zinn, Macpeak & Seas

[57] ABSTRACT

A method for manufacturing a steering wheel involves moulding a steering wheel skeleton 1 and an air bag reception dish 2 integral therewith, placing a folded inflatable bag 3 in the dish, and closing the dish opening with a sealing material 4 which can tear when the bag inflates. The steering wheel skeleton together with its dish 2 filled with the bag 3 and covered with the sealing material 4 is then placed in a mould, and plastic is injected into the mould to form a soft outer covering 5 around the skeleton.

5 Claims, 1 Drawing Sheet

METHOD FOR MANUFACTURING A MOTOR VEHICLE STEERING WHEEL, AND STEERING WHEEL OBTAINED THEREBY

BACKGROUND OF THE INVENTION

The present invention relates to a method for manufacturing a steering wheel, particularly for a motor vehicle, and to a steering wheel obtained according to this method.

More particularly, the invention relates to methods for manufacturing motor vehicle steering wheels which comprise a steering wheel skeleton provided with an open dish for receiving an inflatable bag in the folded state and with a soft covering made of plastic.

The methods for manufacturing this type of steering wheel which are known in the state of the art essentially consist in producing the steering wheel with its skeleton and its soft covering, then in fastening to this steering wheel a module containing at least one inflatable bag to which a soft covering plate is then fixed in order to form the central pad of the steering wheel.

These various assembly operations are performed at the vehicle manufacturers'.

It can be understood that these assembly operations require the various elements of this steering wheel to be assembled one after another and that these operations exhibit a certain number of drawbacks, particularly as regards the time required for this assembly and the presence of fastening members such as rivets or the like for fixing these elements to the skeleton of the steering wheel.

SUMMARY OF THE INVENTION

The object of the invention is therefore to solve these problems.

To this end, the subject of the invention is a method for manufacturing a steering wheel, particularly for a motor vehicle, of the type including a steering wheel skeleton provided with an open dish for receiving at least one inflatable bag in the folded state, and with a soft covering made of plastic, wherein the steering wheel skeleton is produced with the reception dish;

at least the inflatable bag in the folded state is placed in the dish;

the opening of the dish is closed off using a sealing material which can tear when the bag inflates;

the steering wheel skeleton together with its dish provided with the bag and with the sealing material is placed in a mould for manufacturing the soft covering by injection of plastic; and plastic is injected into the mould in order to form the soft covering around the skeleton.

According to another aspect, another subject of the invention is a motor vehicle steering wheel obtained according to this method.

BRIEF DESCRIPTION OF THE DRAWINGS

The invention will be better understood upon reading the description which follows, given solely by way of example and made with reference to the appended drawings, in which.

DETAILED DESCRIPTION OF THE PREFERRED EMBODIMENTS

As can be seen in these figures, a motor vehicle steering wheel includes, in the conventional way, a steering wheel skeleton denoted by the general reference 1 made, for example, by injection-moulding any appropriate alloy.

This skeleton is made with a dish 2 for receiving an inflatable bag in the folded state in the region of its hub for connection to the rest of the steering column shaft of the vehicle.

Advantageously, the dish is formed integrally with the skeleton when the latter is being manufactured.

Figure 1:
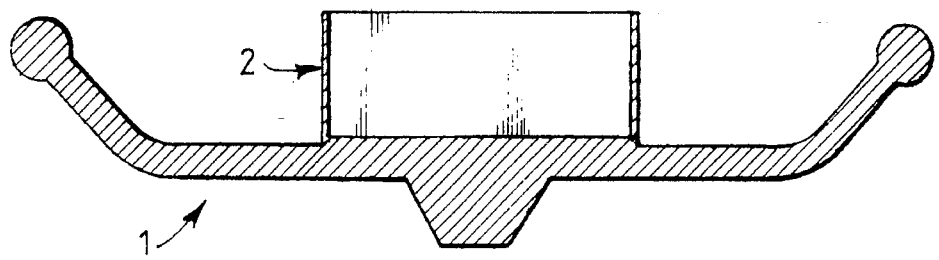
FIGS. 1 to 4 illustrate the various steps in a method for manufacturing a steering wheel according to the invention.
Figure 2:
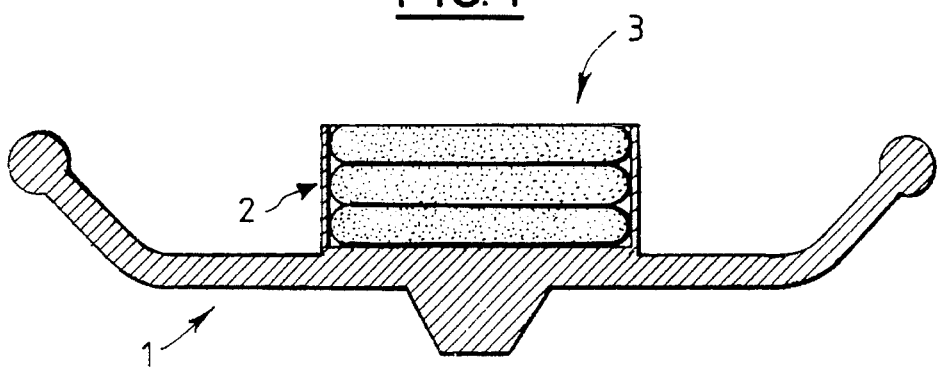

The next step in the manufacturing method according to the invention consists, as illustrated in FIG. 2, in placing at least the inflatable bag in the folded state, denoted by the general reference 3, in the dish 2 of the skeleton 1.

lit will be noted as far as this is concerned, that a gas generator may equally well be placed in this dish, in the conventional way, this gas generator being connected to the rest of the control/operating circuits of the vehicle by means, for example, of electrical connection means.

However, it is known in the state of the art that the gas generator may equally well be placed in some other member of the vehicle, such as the steering column shaft for example.

Figure 3:
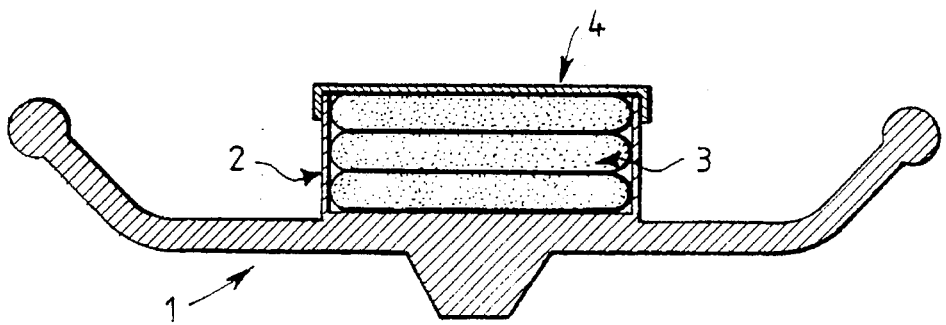

Once this inflatable bag and possibly the gas generator have been placed in the dish 2 of the skeleton 1, the opening of this dish is closed off with the aid of a sealing material which can be torn when the bag inflates, as is illustrated in FIG. 3.

This sealing material may, for example, be in the form of a film 4 stretched over the opening in the dish 2 above the inflatable bag 3.

The peripheral edge of this film is fixed to the corresponding edges of the dish by any appropriate means such as, for example, through the use of an elastic or some other clip.

Figure 4:
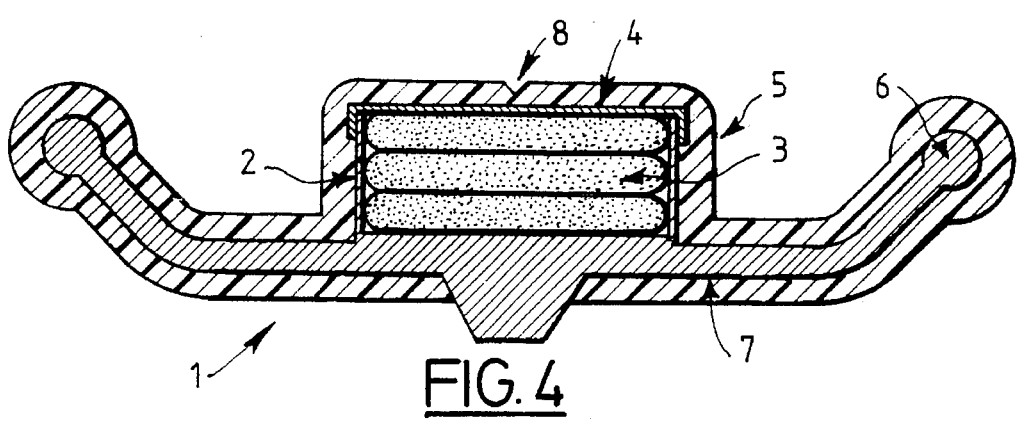

Next, this skeleton together with its dish provided with the inflatable bag 3 and with the sealing film 4 is placed in a mould for manufacturing the soft covering of the steering wheel by injection of plastic, and the plastic is injected into the mould in order to form the soft covering denoted by the general reference 5 in FIG. 4 around the skeleton assembly, that is to say around the rim 6 of the steering wheel, the spokes, for example 7, for connecting this rim to the rest of the steering wheel skeleton, etc.

Of course, the mould may equally well be designed to form preferential breakage zones 8 for this soft covering, facing the opening of the dish in the skeleton, these zones tearing when the bag inflates, as is conventional.

It is therefore understood that this manufacturing method makes it possible to obtain a steering wheel provided with a single-piece plastic soft covering which may be fixed directly to the steering column shaft of the vehicle and which is delivered to the vehicle manufacturers in the assembled state, which makes it possible to solve the previously-mentioned assembly problems.

We claim:

1. Method for manufacturing a steering wheel, particularly for a motor vehicle, of the type including a steering wheel skeleton (1) provided with an open dish (2) for receiving at least one inflatable bag (3) in a folded state, and with a soft covering (5) made of plastic, comprising the steps of:

a) forming a steering wheel skeleton integrally and in one piece with a reception dish;

b) disposing a folded, inflatable bag in the dish;

c) closing off an opening of the dish with a sealing material (4) which can tear when the bag inflates;

d) disposing the steering wheel skeleton together with the integral reception dish provided with the inflatable bag and closed with the sealing material in a mould; and e) injecting a plastic material into the mould to form a soft covering around the skeleton, the dish, and the sealing material.

2. Method according to claim 1, wherein the sealing material comprises a film.

3. Method according to claim 1, wherein the steering wheel skeleton and integral reception dish are formed by injection-moulding an alloy.

4. Steering wheel, particularly for a motor vehicle, manufactured according to the method of claim 1.

5. Method according to claim 2, wherein the steering wheel skeleton and integral reception dish are formed by injection-moulding an alloy.

* * * * *